United States Patent Office 3,268,948
Patented August 30, 1966

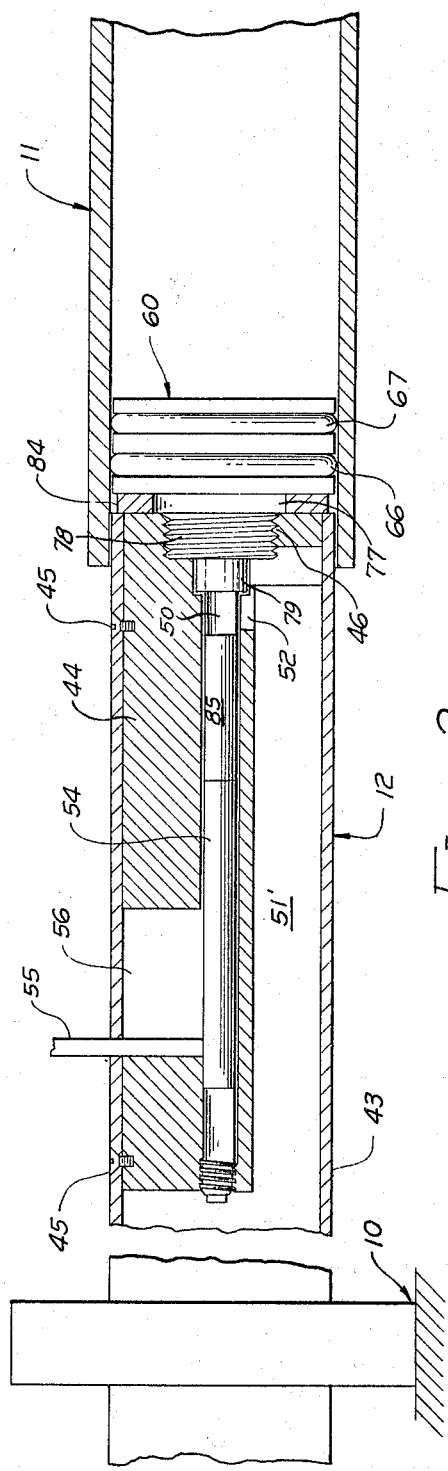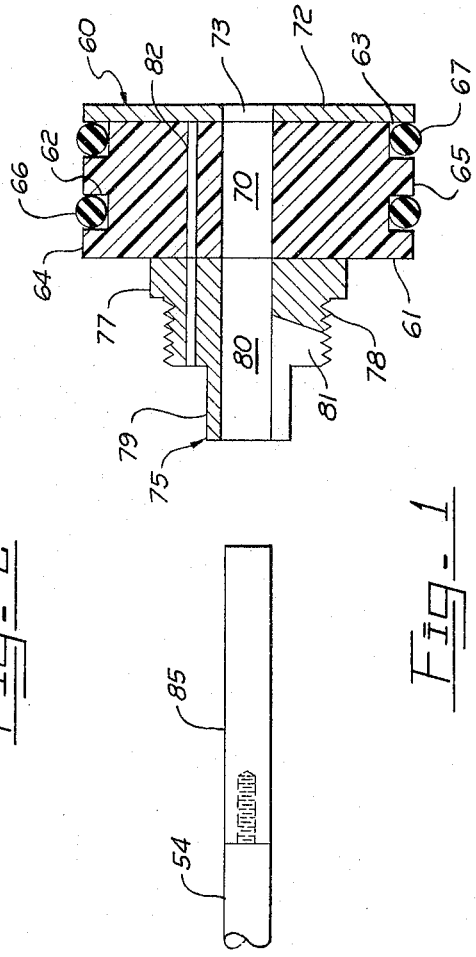

3,268,948
SAUSAGE MANUFACTURE
Norman Swift, Western Springs, Ill., assignor to Swift & Company, Chicago, Ill., a corporation of Illinois
Filed Oct. 6, 1964, Ser. No. 401,930
3 Claims. (Cl. 17—32)

The present invention relates to an improved apparatus for use in the manufacture of sausage or the like. More specifically the present invention is directed to an improved electrode fixture device to form an end for a mold cavity within which sausages, and the like, are formed and coagulated by the application of electrical energy.

In recent years the art of forming sausages, and the like, within rigid molds rather than casings has been developed. A method and apparatus for the practice of this art is disclosed in United States Patent No. 2,877,118, the disclosure of which is included herein by reference. According to that patent, and also according to other examples of this art, sausage emulsion is introduced into a cylindrically shaped mold and is set up therein into a self-sustaining form by the application of electrical energy in sufficient amount, and for sufficient time, to raise the temperature of the emulsion to a coagulation level. Generally it is believed that the coagulation level is reached at approximately 120° F. when the emulsion remains at that temperature for a brief period of time. Even shorter periods of time are required where the temperature is raised to higher levels.

It has been the practice to apply electrical energy to the sausage emulsion through the ends of the mold cavity. That is the opposing ends are constructed in the form of electrodes which are then connected to opposite poles of an electrical source, usually a source of high frequency energy; and when electrical current is applied through the electrodes the internal resistance of the sausage emulsion generates heat uniformly therethrough.

For economy of operation and capital investment it is desirable that each unit of sausage emulsion be set up, or coagulated, in the briefest possible time and thereafter immediately ejected from the mold so that a minimum number of apparatus may be utilized to produce a maximum quantity of product. It will be apparent that the output of the unit of apparatus is basically limited by the period of time required for a charge of emulsion to become coagulated.

I have found that there is a significant heat loss through the usual electrode structure. This is because the electrode must be made of an electrically conductive material which is usually also a good conductor of heat. Thus where sufficient time is provided for the major portion of a sausage to become coagulated, the ends thereof are often insufficiently coagulated and subject to damage upon being ejected from the mold. On the other hand if sufficient time is provided to adequately coagulate all of the sausage, including ends, the production rate of the apparatus is significantly reduced.

This problem has been observed to be even more pronounced in the apparatus of Patent No. 2,877,118 at one end of the mold cavity where the end closure is designed to function both as an electrode and as an emulsion nozzle for filling the mold cavity. Because of the dual function the electrode has been backed by a large metal structure which delivers emulsion to the mold cavity and closes off a nozzle opening in the electrode when the mold cavity is full. Additionally the introduction of relative low temperature emulsion through the electrode structure operates to lower the temperature of the latter and the metal structure. This large mass of cooled metal has operated to quickly remove heat away from that end of the sausage as it is being heated by electrical energy.

Accordingly, it is a principal object of the present invention to provide an improved electrode structure for use in molding sausages, and the like, which reduces the loss of heat from the sausage ends.

It is a further object of the present invention to provide an improved apparatus comprising a combined electrode and emulsion nozzle fixture for use in the molding of sausages, and the like, wherein the combined fixture is devised to significantly reduce heat loss from the sausage end.

Basically the present invention involves the use of a minimum quantity of metal in an electrode structure by employing a relatively thin electrode disk mounted on one end of a thermal insulator body member and connectable to a source of electrical energy by a plurality of thin electrically conductive members extending from the electrode disk through the insulator body. Preferably the body is provided with means to removably and replaceably mount same upon the molding apparatus, as continued use tends to erode the face of the electrode to the point that it requires replacement. Also it is preferred that the electrode disk and insulator body be provided with an axial passageway for the introduction of emulsion through the electrode fixture and into a mold cavity.

Further objects and advantages of the present invention will become apparent from the following description of a preferred embodiment taken in conjunction with the drawings in which:

FIGURE 1 is a side view, partially in section, of a preferred form of the present invention; and FIGURE 2 is a side view, in partial section, showing the device of FIGURE 1 mounted on a portion of sausage molding apparatus.

As previously mentioned the preferred form of the present invention, as illustrated, was deviced for the nozzle-electrode end of the apparatus disclosed in the Hensgen et al. Patent No. 2,877,118. (The disclosure of that patent is included herein by reference and a portion of that apparatus is shown herein in FIGURE 2 where parts common to the aforementioned patent are denoted by the same reference characters.) That sausage forming apparatus is mounted on a frame generally 10 and comprises a mold generally 11, an injection nozzle generally 12 which also serves as an electrode for one end of the mold, and a closure (not shown) for the other end of the mold. The mold 11 is in the form of a sleeve that is reciprocable onto and away from the nozzle generally 12. As taught in the aforementioned patent, the nozzle generally 12 is electrically grounded to the frame 10; and the closure member (not shown) is electrically connected, by a wire, to a suitable source of electrical energy (also not shown), the latter being also grounded to frame 10. A resistance circuit will be completed from the power source through the nozzle 12 and opposite closure upon the introduction of a sausage emulsion between the latter two elements, the emulsion then acting as a resistance load and will become heated upon electrical current being supplied from the power source. In operation the mold sleeve 11 is reciprocated to the left across the nozzle generally 12 and thereafter withdrawn as emulsion is ejected through the nozzle and until it reaches the position shown in FIGURE 2. Thereafter electrical energy is introduced at both end closures and the emulsion is coagulated.

Then the mold sleeve 11 is moved to the right away from the nozzle 12 whereat the formed sausage may be ejected. The operation is then repeated for the production of the next sausage item.

Referring to FIGURE 2 the nozzle 12 is formed of a tubular body 43 having a partial insert 44 secured therein by means of screws 45. These parts are preferably made of metal which forms one electrical connection, through ground, to the electrode mounted thereon. The outer end of insert 44 is threaded, as illustrated at 46, for the attachment of an electrode member. The insert 44 is also provided with an axial opening 50. However, since the insert 44 only partially fills the tubular body 43, a passageway 51 is present along one side of the latter. Passageway 51 communicates with the aforementioned opening 50 near the outer end of the insert 44 by means of a cross passageway 52.

A cylindrical valve rod 54 is reciprocably mounted within the opening 50 to form the slide valve which controls the flow of sausage emulsion through the cross passage 52. The valve rod 54 is moved within opening 50 by means of a connecting rod 55 which passes through a slot 56 in the insert 44 and tubular body 43.

The device of the present invention is best seen in FIGURE 1, and comprises an electrode fixture generally 60 which is demountably positioned on the outer end of the tubular body 43. The electrode fixture 60 comprises a cylindrical insulator body member 61 which is provided with one or more peripheral grooves 62, 63 and annular ridges 64, 65 (preferably two each) for seating O rings 66, 67. Where the electrode fixture is to serve as an emulsion nozzle the insulator body member 61 is also provided with an axial passageway 70 which is aligned with the opening 50 when mounted on the tubular body 43.

A congruent electrode face disk 72 is mounted on the outer end of the cylindrical insulator body member 61 and preferably acts to also retain one of the O rings 67 in its groove 63. The electrode face disk 72 is preferably relatively thin and utilizes the minimum amount of metal required to provide uniform introduction of electrical energy across its surface. A flat disk is illustrated although, if desired, it may be concave or convex. Preferably a noble metal is used to minimize electrical erosion. It will thus be seen that a further advantage of the structure of this invention is to reduce the cost of the electrode element by reducing the quantity of a noble metal in the structure. The electrode face disk is preferably also provided with an axial passageway 73 aligned with the passageway 70 in the insulator body 61.

It is preferred to mount a tail stock generally 75 at the end of the insulator body member 61 opposite the electrode disk 72, for the purpose of attaching the fixture generally 60 to the sausage molding apparatus. It will become apparent that the tail stock should also be fabricated from an electrically conductive metal. The tail stock preferably is in the form of stepped cylinders including a mounting shoulder 77, upon which the insulator body 61 is mounted, a threaded barrel 78, mating with the threads 46 in insert 44, and a sleeve 79 fitting within the insert 44. An axial passageway 80 is provided in line with passageways 70 and 73 and opening 50. Preferably a lateral passageway 81 is cut into a segment of the threaded barrel 78 and sleeve 79 so as to mate with the cross passageway 52 of insert 44 when the fixture generally 60 is threaded fully into the nozzle generally 12.

A plurality of thin connecting pins 82 (one shown in FIGURE 1) constructed of metal are inserted through the insulator body 61 to electrically connect the tail stock generally 75 with the face disk 72. Additionally a washer ring 84 is positioned about the circumference of the joint between the tubular body 43 and the insulator body 61. Finally the valve rod 54, which is slidingly mounted in the opening 50 of insert 44, is modified to include an end piece 85 constructed of a thermal insulating material, either the same or similar to that used in the insulator body 61. The end piece 85 is preferably of a length substantially equal to the length of the fixture generally 60.

It will be apparent that, in addition to the preferred embodiment illustrated, the present invention is adaptable to structures which do not also function as an emulsion nozzle. For example, axial passageways 70, 73 and 80 may be omitted from the disclosed device and such structure employed as the other end closure shown in Patent No. 2,877,118.

In the construction of the disclosed device the cylindrical insulator body member 61 may be fabricated by machining or molding any of several suitable materials well known for characteristics of low thermal capacity. Such material should be either machinable or formable according to the method of fabrication selected. Most common plastic materials are suitable, such as polyvinyl chloride plastics, acrylic materials such as Lucite, phenol formaldehyde resins such as Bakelite, fluorinated hydrocarbons such as Teflon, nylon and others. I have found nylon to be particularly suitable. Preferably the electrode face disk 72 is comprised of gold or a high gold content alloy; and is bonded by an adhesive to the insulator body member 61. Similarly the tail stock generally 75 is also bonded to the insulator body 61, although the tail stock need not be comprised of a noble metal but may be suitably manufactured from steel or other common metal. Several suitable adhesives are available to bond the aforementioned parts together. Most epoxy resin base adhesives are adequate. The connecting pins 82 may be positioned by several well-known methods. For example, after the electrode disk 72 and tail stock 75 are bonded to the insulator body 61 the combined fixture generally 60 may be drilled through, face to face, at a plurality of locations, and copper or gold wire inserted. The latter may be then soldered at both the face disk 72 and tail stock 75, and any excess wire removed so as to leave smooth face surfaces.

Obviously many modifications and variations of the invention as hereinbefore set forth may be made without departing from the spirit and scope thereof, and therefore only such limitations should be imposed as are indicated in the appended claims.

I claim:

1. In a sausage molding apparatus having a fixed nozzle-electrode assembly forming an end closure and source of heat energy for a cylindrical sleeve mold member, the improvement in said nozzle-electrode assembly comprising: a cylindrical thermal insulator member mountable to an end of said assembly; an electrode face disk fastened to said insulator body opposite said assembly, both of said insulator member and disk having an axial passageway for the ejection of emulsion; and a plurality of electrically conductive pins extending through said thermal insulator member and connected to said electrode face disk for conducting current between said assembly and said face disk.

2. In a sausage molding apparatus having a fixed nozzle-electrode assembly forming an end closure, feed passageway, and source of heat energy for a cylindrical sleeve mold member wherein said nozzle-electrode assembly includes a tubular body member fixed at one end to a frame, said body member being electrically conductive and having female threads at the other end thereof, the improvement of a nozzle-electrode fixture comprising: a cylindrical thermal insulator member for mounting on said threaded end of the tubular body; a tail stock fastened to said insulator, said tail stock being electrically conductive and provided with male threads mating with said female threads on said tubular body member; an electrode face disk fastened to said insulator body member opposite said tail stock, said face disk being electrically connected with said tail stock by a plurality of electrically conductive pins extending through said insulator body member; coextensive longitudinal passageways in said insulator member, tail stock, and disk; and an insulator rod mounted for reciprocable movement axially through said longitudinal passageways in said insulator body, tail stock, and face disk.

3. The device of claim 2 including a plurality of O rings seated on said insulator body member to provide a close fit within said cylindrical sleeve.

References Cited by the Examiner

UNITED STATES PATENTS

| | | | |
|---|---|---|---|
| 1,690,759 | 11/1928 | Trimm | 339—172 |
| 2,877,118 | 3/1959 | Hensgen et al. | 99—109 |

SAMUEL KOREN, *Primary Examiner.*

LUCIE H. LAUDENSLAGER, *Examiner.*